June 15, 1965  S. R. JACKSON ETAL  3,188,798
EXHAUST GAS SYSTEMS FOR INTERNAL COMBUSTION ENGINES
Filed Feb. 20, 1964  2 Sheets-Sheet 1

United States Patent Office 3,188,798
Patented June 15, 1965

3,188,798
EXHAUST GAS SYSTEMS FOR INTERNAL
COMBUSTION ENGINES
Squire R. Jackson, Burnley, and John Smith, Accrington, England, assignors to Joseph Lucas (Industries) Limited, Birmingham, England
Filed Feb. 20, 1964, Ser. No. 346,294
1 Claim. (Cl. 60—30)

It is well known that owing to incomplete combustion in the cylinders of an internal combustion engine, obnoxious exhaust fumes are discharged into the atmosphere through the exhaust system, and the object of the present invention is to provide convenient means for minimising the amount of carbon monoxide and hydro-carbons emitted from the exhaust system.

According to the invention a device for use in an exhaust system for an internal combustion engine comprises, in combination, an elongated casing having an exhaust gas inlet at its up-stream end, an air jacket surrounding the casing in spaced relationship, an air inlet in the air jacket adjacent the exhaust inlet, a combustion chamber mounted in the casing in spaced relationship, said combustion chamber being open to an outlet at the downstream end of the casing, a first tubular part extending from the downstream end of the casing in spaced relationship towards the upstream end portion of the combustion chamber which constitutes a combustion zone, laterally extending passages through which the downstream end of the first tubular part, which is closed to the outlet is open to the downstream end of the space within the casing, a second tubular part extending in spaced relationship within the first tubular part from the downstream end of the casing to a position adjacent the upstream end of the first tubular part, and a laterally extending passage through which the downstream end of the second tubular part, which is closed to the outlet and to the space within the casing, is in communication with the air jacket, the arrangement being such that exhaust gases from the inlet can flow around the combustion chamber in a downstream direction, and thence in an upstream direction through the first tubular part to the combustion zone, whilst air from the air inlet flows in a downstream direction through the air jacket, and thence in an upstream direction through the second tubular part to the combustion zone, and the products of combustion from said zone can flow around the tubular parts and lateral passages to the outlet.

Figure 1:
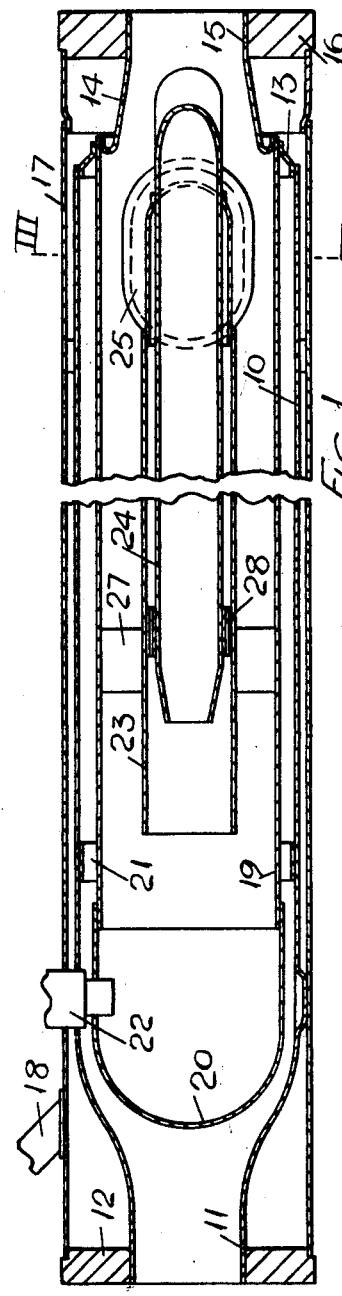
Figure 2:
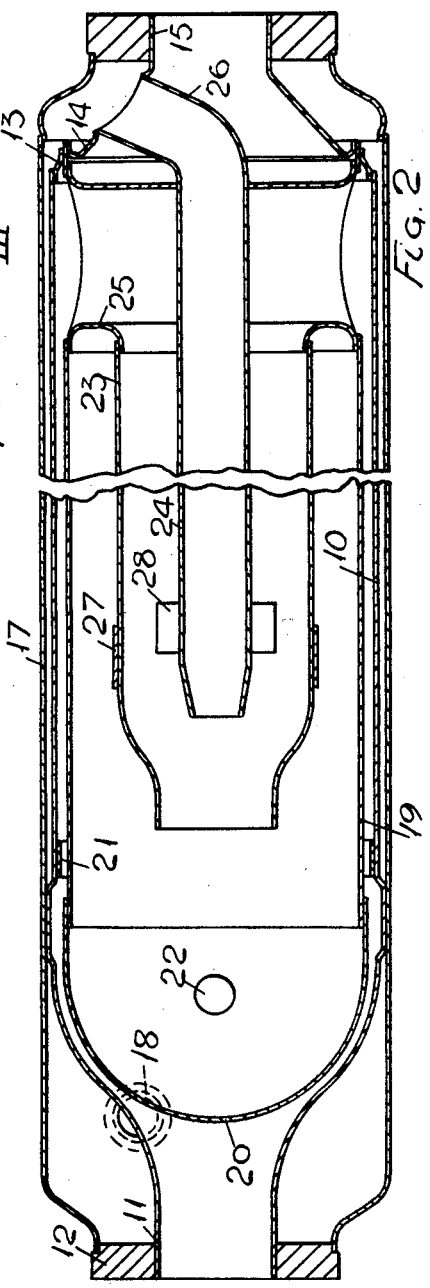
Figure 3:
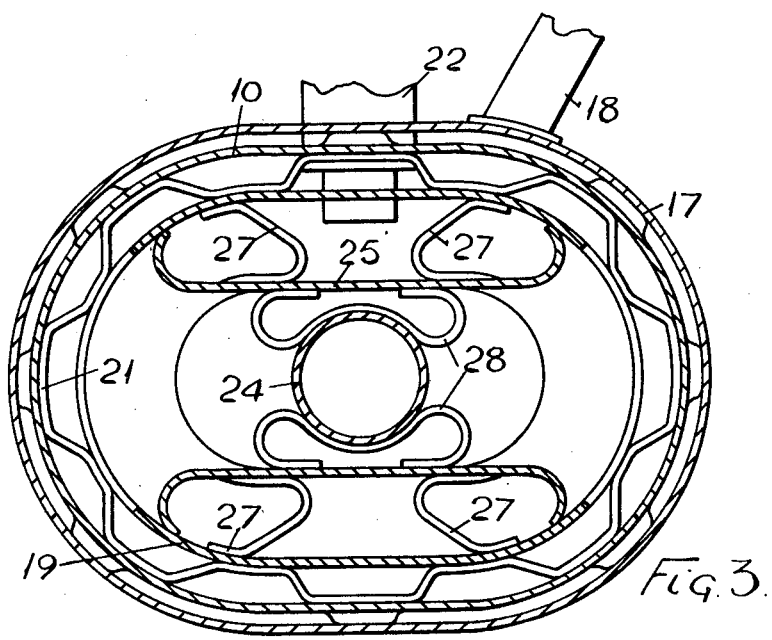

An example of the invention is shown by way of illustration in the accompanying drawings in which:

FIGURE 1 is a cross-sectional side elevation view of a device constructed in accordance with the present invention, FIGURE 2 is a cross-sectional plan view of the same device and, FIGURE 3 is a cross-sectional view on the line 111—111 in FIGURE 1.

In the example illustrated, the device comprises an elongated casing 10 of symmetrical oval cross section, that is to say the cross section comprises two semi-circular ends joined by two parallel sides. One end referred to as the upstream end, of the casing 10 is tapered to form a short cylindrical snout 11, and this snout is surrounded by an annular ring 12. The opposite end of the casing has a stepped ring 13 and a sleeve 14 secured thereto, the free end of the latter also forming a short cylindrical snout 15 surrounded by an annular ring 16. The rings 12 and 16 serve to support opposite ends of an air jacket 17 surrounding the casing 10 in spaced relationship. The snout 11 at the upstream end, constitutes an exhaust gas inlet which is adapted for connection to the exhaust pipe of an internal combustion engine. The snout 15 at the other and downstream end of the casing constitutes an outlet for the products of combustion and is adapted for connection to a tail pipe or other part of the exhaust system. Moreover, in the air jacket 17 at the upstream end, is an air inlet pipe 18 adapted for connection to a source whereby combustion air may be supplied to the air jacket 17.

Mounted in spaced relationship within the casing 10 is a combustion chamber 19 of similar but smaller cross-section to the casing; this combustion chamber having a part spherical closed end 20 at the upstream end of the device and being open to the exhaust gas outlet at the downstream end. The upstream end 20 of the combustion chamber 19, which constitutes a combustion zone, is mounted in spaced relationship to the casing by means of a corrugated strip 21. A boss accommodating a spark plug or other ignition means 22 extends through the air jacket and casing wall. The downstream end of the combustion chamber has welded to its inner periphery the upstream end of the sleeve 14, and welded to its outer periphery, the stepped ring 13 which is welded to the end of the casing 10. By this means not only is the combustion chamber supported in spaced relationship within the casing, but the casing is closed to the outlet.

Supported in spaced relationship within the combustion chamber 19 is a first tubular part 23 of similar but smaller cross-section to the combustion chamber, whilst extending axially within the first tubular part 23 is a second tubular part 24 of circular cross-section. The first tubular part 23 extends from the downstream end of the casing towards the combustion zone and is tapered at its end directed to the combustion zone. At its downstream end the first tubular part is in communication with the space between the casing 10 and the combustion chamber 19 through a pair of diametrically opposed passage forming portions 25 around which the products of combustion from the combustion zone can flow from the combustion chamber 19 to the outlet. Moreover, the downstream end of the second tubular part 24 is in communication with the air jacket 17 through a single laterally extending passage forming portion 26, and the upstream end of the second tubular part 24 which is slightly tapered terminates in the tapering area of the first tubular part 23. The upstream end of the first tubular part 23 is mounted in spaced relationship within the combustion chamber 19 by means of supporting brackets 27, and the second tubular part 24 is mounted in the upstream end of the first tubular part 23 by brackets 28. The downstream ends of the tubular parts 23, 24 are both supported relative to the casing by means of the walls of the aforesaid passage forming portions 25 and 26 which extend transversely relative to the axis of the casing 10. In use, exhaust gases from the exhaust gas inlet flow through the space between the casing 10 and the combustion chamber 19 to the pair of transverse passage forming portions 25 thence in contra direction between the first and second tubular parts 23, 24 to the combustion zone. Meanwhile air flowing in a downstream direction from the air inlet through the air jacket 17 is passed via the single transverse passage forming portion 26 to the second tubular part 24, wherein it flows in an upstream direction and is entrained with the exhaust gases entering the combustion zone. The products of combustion from the combustion zone flow around the first tubular part 23 in a downstream direction, to the outlet.

Having thus described our invention what we claim as new and desire to secure by Letters Patent is:

A device for use in an exhaust system for an internal combustion engine which comprises an elongated casing having an exhaust gas inlet at an upstream end, an elongated air jacket surrounding the casing in spaced relationship having an air inlet adjacent to the exhaust inlet of the casing, an elongated combustion chamber mounted in the casing in spaced relationship having an outlet opening at a downstream end of the casing and closed at its upstream end, a first tubular part mounted in the combustion chamber in spaced relationship extending from the downstream end of the casing towards the upstream end thereof, at least one laterally extending passage forming portion affording communication between the interior of the downstream end of the first tubular part and the space defined between the casing and the combustion chamber, said space being closed at its downstream end, a second tubular part mounted in the first tubular part in spaced relation, extending from the downstream end of the casing to a position adjacent the upstream end of the first tubular part, a further laterally extending passage forming portion affording communication between the interior of the downstream end of the second tubular part and the space between the casing and the air jacket, said space being closed at its downstream end.

No references cited.

JULIUS E. WEST, *Primary Examiner.*